United States Patent [19]

Kapgan

[11] Patent Number: 4,872,713
[45] Date of Patent: Oct. 10, 1989

[54] COUPLING DEVICE

[75] Inventor: Michael Kapgan, Foster City, Calif.

[73] Assignee: Raychem Corporation, Menlo Park, Calif.

[21] Appl. No.: 148,732

[22] Filed: Jan. 25, 1988

Related U.S. Application Data

[63] Continuation-in-part of Ser. No. 12,260, Feb. 19, 1987, abandoned.

[51] Int. Cl.$^4$ .............................................. F16L 19/08
[52] U.S. Cl. ................................... 285/381; 285/369; 285/382.7; 285/422; 285/423
[58] Field of Search ..................... 285/381, 382.7, 364, 285/422, 423

[56] References Cited

U.S. PATENT DOCUMENTS

| | | | |
|---|---|---|---|
| 418,752 | 1/1890 | Rogers | 285/381 |
| 3,174,851 | 3/1965 | Buehler et al. | 75/170 |
| 3,351,463 | 11/1967 | Rozner et al. | 75/170 |
| 3,513,429 | 5/1970 | Helsop | 285/381 X |
| 3,753,700 | 8/1973 | Harrison et al. | 75/175.5 |
| 3,783,037 | 1/1974 | Brook et al. | 148/11.5 |
| 4,144,104 | 3/1979 | Brooks | 148/11.5 |
| 4,314,718 | 2/1982 | Broyles et al. | 285/381 X |
| 4,424,991 | 1/1984 | Hill et al. | 285/381 |
| 4,469,357 | 9/1984 | Martin | 285/381 |

FOREIGN PATENT DOCUMENTS

| | | |
|---|---|---|
| 153199 | 1/1984 | European Pat. Off. . |
| 157640 | 4/1984 | European Pat. Off. . |
| 185452 | 6/1985 | European Pat. Off. . |
| 3306832 | 8/1984 | Fed. Rep. of Germany ...... 285/381 |

Primary Examiner—Dave W. Arola
Attorney, Agent, or Firm—Simon J. Belcher; Herbert G. Burkard

[57] ABSTRACT

A device for coupling to an object such as a pipe, particularly for joining pipes together, comprising a tubular sleeve of which at least one end portion has a wall that is weakened to facilitate radial deformation, a shape memory alloy driver having a portion of the sleeve other than the weakened portion positioned in the direction of its recovery, and a collar of a dimensionally heat-recoverable polymeric material having at least part of the weakened portion of the sleeve positioned in the direction of its recovery.

Tensile strength or a seal or both between the sleeve and the object is provided by the shape memory alloy driver which deforms the sleeve into sealing contact with the pipes. Relief from transverse strain imposed on the joint between the pipes and the device is provided by the weakened portion of the sleeve which is supported by the collar.

10 Claims, 1 Drawing Sheet

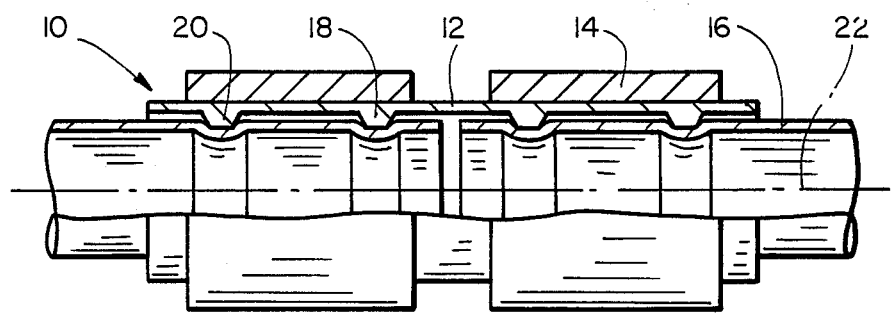
FIG_1
(PRIOR ART)
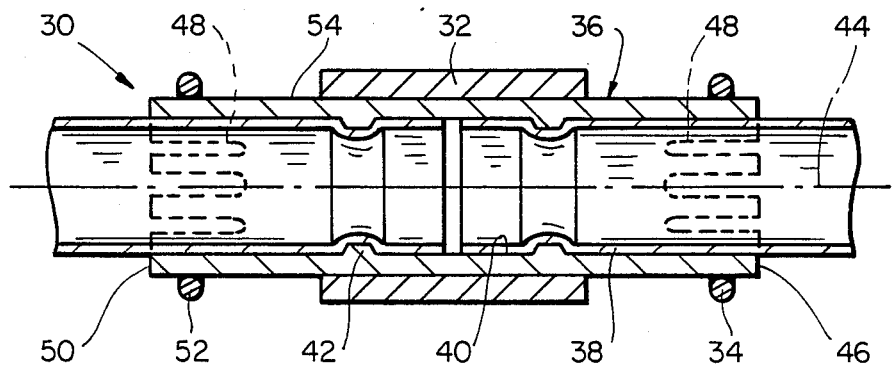
FIG_2
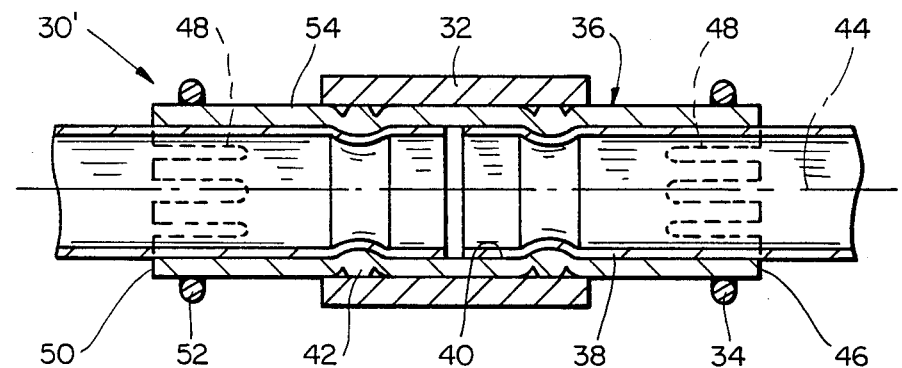
FIG_3

COUPLING DEVICE

CROSS-REFERENCE TO RELATED APPLICATIONS

This application is a continuation-in-part of commonly assigned copending application Ser. No. 012,260, filed 2-19-87, now abandoned, the disclosure of which is incorporated herein by this reference thereto.

BACKGROUND OF THE INVENTION

This invention relates to a device for coupling to an object such as a pipe or a rod. For example the device may be used to couple two or more pipes.

U.S. Pat. No. 4,469,357 discloses a composite coupling for joining cylindrical substrates, which comprises a tubular heat-recoverable metallic compression sleeve and a tubular metallic insert disposed in the direction of recovery of the sleeve so that when the sleeve recovers, it deforms the insert so that it contacts the substrates to be joined. The insert may be provided with longitudinal terminal slots.

SUMMARY OF THE INVENTION

I have devised a coupling device which employs a collar of a dimensionally heat-recoverable polymeric material in conjunction with a tubular sleeve which has an end portion with a weakened wall, and which allows that portion of the sleeve to provide strain relief for the joint between the sleeve and a substrate.

The present invention therefore provides a device for coupling to an object, comprising:

(a) a tubular sleeve of which an end portion has a wall that is weakened to facilitate radial deformation thereof, and another portion whose wall is not so weakened;

(b) a shape memory alloy driver having a portion of the sleeve, other than that portion whose wall is weakened, positioned in the direction of its recovery; and (c) a collar of a dimensionally heat-recoverable polymeric material having at least part of that portion of the sleeve whose wall is weakened positioned in the direction of its recovery.

The device of the invention has the advantage that it is able to provide relief from transverse strain imposed on the coupling between the pipes, by flexing of the weakened end portion of the sleeve. The provision of a collar around the weakened end portion ensures that that end portion is supported, and is therefore better able to provide strain relief. The use of a recoverable material for the collar has the advantage of ease of installation, as is known of recoverable materials in general. According to the present invention, however, particular recoverable materials are selected for particular components of the coupling device. A shape memory alloy driver is selected to deform the portion of the sleeve whose wall is not weakened so as in use to join the device to an object. The use of a shape memory alloy member allows high forces to be generated so as to make a fluid tight joint. A collar of polymeric material is used to support the portion of the sleeve which has the weakened wall. By appropriate selection of polymeric material, sufficient force can be generated by the collar to provide the necessary support. The use of a polymeric material has the significant advantage of reducing the cost of the coupling compared with couplings of the type disclosed in U.S. Pat. No. 4,469,357 where only an element formed from a shape memory alloy is used to exert recovery forces. Also, the use of polymeric material allows the configuration of the collar to be adjusted to suit particular requirements more conveniently than is possible when the collar comprises a shape memory alloy. This is because of the relative ease with which polymeric components can be manufactured compared with metallic components, and is particularly advantageous for the support to be imparted to the weakened wall of the sleeve since it allows the amount of strain relief provided by the sleeve to the joint between the device and another object to be selected according to the requirements of a particular application.

The provision of strain relief by the device of the invention is particularly advantageous when the sleeve bears, on one of its principal surfaces, at least one radial tooth which extends circumferentially about the longitudinal axis of the sleeve. Such a tooth is preferably provided on the internal surface of the sleeve, or on the portion of the sleeve whose wall is not weakened, or more especially both. Such a tooth may be relied on to enhance the tensile strength of the joint between the device and an object, or to enhance the seal between the device and the object, or both, by being forced into the surface of the object by the shape memory alloy driver when it recovers. When the sleeve bears such a tooth, strain imparted to the joint between the device and the object can be concentrated on the tooth. This can be undesirable since it can lead to a reduction in the tensile strength of the joint or a weakening of the seal between the device and the object or both. These undesirable effects are mitigated by the device of the present invention which provides relief against strain applied to a tooth on the sleeve of the device.

The wall of the sleeve may be weakened by the formation therein of one or more slots or elongate flats. A flat is an area of the wall of the sleeve in which the thickness has been reduced. Preferably the slots and flats are disposed parallel to the longitudinal axis of the sleeve. It is preferred that the wall is weakened so that when radial force is applied to the weakened portion of the sleeve, it is deformed symmetrically.

While the sleeve is generally referred to as being tubular, it should be understood that the word "tubular" is not limited to right cylindrical hollow sleeves but also includes other sleeves such as those which are Y-shaped, T-shaped and X-shaped.

Preferably, the sleeve has more than one end portion which has a wall that is weakened to facilitate radial deformation thereof. When the sleeve is a right cylindrical hollow sleeve, for example, it is preferred that the wall is weakened at both ends. When the sleeve has three or more ends, for example by being Y-shaped, T-shaped or X-shaped, one or more, preferably each, of the ends of the sleeve has a portion with a weakened wall. Such a sleeve, together with a collar of heat-recoverable polymeric material associated with each weakened wall end portion, can be used to provide a strain relieved coupling between as many objects as the sleeve has ends.

The recoverable components of the device may be expansible or shrinkable. Shrinkable components are preferred, in which case they will be arranged on the external principal surface of the sleeve so that when they recover, they deform the sleeve inwardly, into contact with an object positioned within it.

The object which may be coupled by means of the device of the invention may be solid or hollow when the recoverable components of the device are shrinkable. For example they may be pipes, rods, bars or cables. When the recoverable components of the device are expansible, the objects to be coupled will be hollow, so that the device can be positioned within it, and so that it recovers into contact with the internal surface when heated.

The device may be used to couple like objects together, or it may be used to couple different objects. For example, it may be used to terminate a pipe, for example to couple it to a pump or another piece of equipment. It may form a part of a screw fitting, serving to attach a circumferential flange (which can form part of the sleeve) to an object which is engaged by a threaded collar for attachment to an appropriately threaded mateable collar.

The driver may comprise one or more elements, each comprising shape memory alloy material. For simplicity of assembly, it is preferred to use a one piece driver having a configuration which is appropriate to the number of objects to be connected and to the configuration of the sleeve. It can in some circumstances be advantageous to use a plurality of ring-like driver elements, each serving to deform a respective portion of the sleeve. This is particularly advantageous when the sleeve is other than a right cylindrical hollow sleeve. Preferably, a ring driver is arranged to recover to compress the sleeve at a point at which a tooth is provided on one or both of its principal surfaces.

The alloy used to form the driver will be selected according to certain desired properties such as the recovery temperature, the conditions likely to be encountered in use, and the material and physical characteristics of the liner. Suitable shape memory alloys are disclosed in U.S. Pat. No. 3,174,851, U.S. Pat. No. 3,351,463, U.S. Pat. No. 3,753,700, U.S. Pat. No. 3,783,037, U.S. Pat. No. 4,144,104 and EP-A-185452.

Suitable materials for the collar of the device will be selected according to certain desired properties such as the force desired to be exerted by the collar when it recovers, the recovery temperature, and the conditions likely to be encountered in use. Particularly preferred materials for the collar include high molecular weight polyethylenes having a molecular weight of at least about 150,000, for example from about 150,000 to about 600,000, preferably from 200,000 to about 400,000. A particularly preferred material for the collar comprises sintered ultra high molecular weight polyethylene (UHMWPE) having a molecular weight of at least about $1.5 \times 10^6$, preferably from about $2 \times 10^6$ to about $4 \times 10^6$, for example at least about $3 \times 10^6$. Such a material is disclosed in EP-A-153199 and conductive articles made from UHMWPE are disclosed in EP-A-157640.

The sleeve is preferably formed from a metal. It is particularly preferred that the metal is one which is gall-prone as discussed in U.S. Pat. No. 4,469,357.

BRIEF DESCRIPTION OF THE DRAWINGS

FIG. 1 is an elevational view, partly in cross-section, of a prior art composite device, after recovery;

FIG. 2 is a sectional view of a composite device according to the invention, after recovery; and FIG. 3 is a sectional view of another composite device according to the invention, after recovery.

DESCRIPTION OF PREFERRED EMBODIMENTS

Referring to the drawings, FIG. 1 shows a composite device of the type disclosed in U.S. Pat. No. 4469357 which comprises a pair of heat-recoverable shape memory alloy drivers 14 and a tubular sleeve 12 which has a plurality of radial teeth 18,20 circumferentially formed about the longitudinal axis 22 of the sleeve.

In use, objects such as pipes 16 are inserted in the sleeve 12. The temperature of the drivers 14 is then raised above their transformation temperature to cause them to recover so that they compress the sleeve 12 radially and force the teeth 18,20 to bite into the external surface of the pipes 16. The teeth thus serve to retain the pipes within the sleeve, and to enhance the seal between the pipes and the sleeve.

FIGS. 2 and 3 show devices according to the present invention. FIG. 2 shows a device 30 which comprises a shape memory alloy driver 32, collars 34,52 of a heat-recoverable polymeric material, and a tubular sleeve 36, the internal surface 40 of which bears a plurality of radial teeth 42 which extend circumferentially about its longitudinal axis 44.

The wall of the sleeve is weakened at each end portion 46,50 by the provision of slots 48. The collars 34,52 are positioned, one at each end of the sleeve, over each of the portions that has a weakened wall.

In use, pipes 38 are inserted into the sleeve 12, and the collars 34,52 and the driver 32 are heated above their respective transformation temperatures to cause them to recover, and to deform the sleeve into contact with the pipes.

The device 30' shown in FIG. 3 differs from that shown in FIG. 2 in that the radial teeth 42 are provided on the external surface 54 of the sleeve 36.

What is claimed is:

1. A device for coupling to an object, comprising:
   (a) a tubular sleeve of which an end portion has a wall that is weakened to facilitate radial deformation thereof, and another portion whose wall is not so weakened;
   (b) a shape memory alloy driver having a portion of the sleeve, other than that portion whose wall is weakened, positioned in the direction of its recovery; and
   (c) a collar of a dimensionally heat-recoverable polymeric material having at least part of that portion of the sleeve whose wall is weakened positioned in the direction of its recovery.

2. A device as claimed in claim 1, in which two end portions of the sleeve have a wall that is weakened to facilitate radial deformation.

3. A device as claimed in claim 1, in which the end portion of the sleeve whose wall is weakened has longitudinal extending slots therein.

4. A device as claimed in claim 1, in which the sleeve bears, on one of its principal surfaces, at least one radial tooth which extends circumferentially about the longitudinal axis of the sleeve.

5. A device as claimed in claim 4, in which the tooth is provided on the internal surface of the sleeve.

6. A device as claimed in claim 4, in which the tooth is provided on the portion of the sleeve whose wall is not weakened.

7. A device as claimed in claim 4, in which there are a plurality of such teeth provided on one of the principal surfaces of the sleeve.

8. A device as claimed in claim 1, in which the polymeric material of the collar comprises an ultra high molecular weight polyethylene.

9. A device a claimed in claim 1, in which the sleeve is formed from a metal.

10. A device as claimed in claim 9, in which the metal is gall-prone.

* * * * *